L. L. ROWE.
FAUCET.
APPLICATION FILED OCT. 18, 1910.
1,032,706.  Patented July 16, 1912.
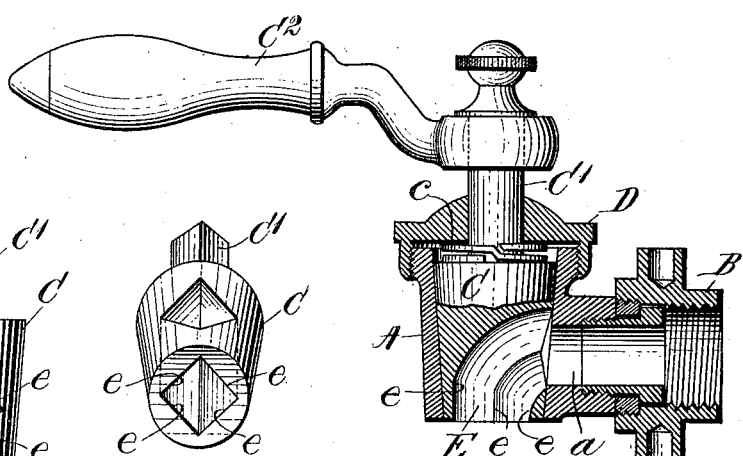
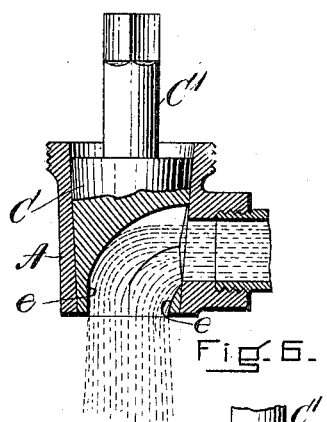
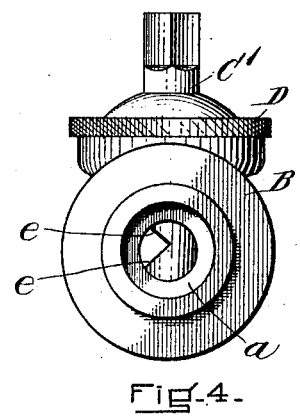

UNITED STATES PATENT OFFICE.

LEVI L. ROWE, OF BOSTON, MASSACHUSETTS.

FAUCET.

1,032,706.

Specification of Letters Patent.  Patented July 16, 1912.

Application filed October 18, 1910. Serial No. 587,723

*To all whom it may concern:*

Be it known that I, LEVI L. ROWE, of Boston, in the county of Suffolk and State of Massachusetts, a citizen of the United States, have invented a new and useful Improvement in Faucets, of which the following is a specification.

My faucet is more especially designed for use with chocolate and milk urns and in other places where the faucet requires to be very carefully cleaned although it is useful in other cases. Where cleanliness is a matter of absolute necessity a faucet containing a long delivery tube as well as a faucet which contains a large number of parts is undesirable, for every part of such a faucet must be thoroughly cleaned at least as often as once a day in order to prevent the souring of the milk drawn through it or the clogging with sediment from chocolate or other liquid. For this reason a faucet having a very short delivery tube is very desirable, in fact almost essential, but the difficulty with such faucets as heretofore constructed has been that the liquid being under some pressure starts to run through the faucet before the passage is fully open and hence the stream acquires a rotary movement which causes the liquid to be thrown out sidewise in all directions on leaving the faucet, often spreading outside the rim of the cup or receptacle into which the liquid is to be drawn. The only attempt so far as I know to overcome this difficulty has been by dividing the outlet passage by a partition so that the stream is separated into two parts. The disadvantage of this structure lies in the fact that it is extremely difficult to keep such a faucet clean as the inner side or edge of the partition is hard to reach and the faucet as a whole is no easier to keep clean than the ordinary faucet with a long nozzle. In the case of the faucet with a long nozzle the swirling or rotary movement of the stream is reduced probably because of the frictional engagement of the stream with the long interior surface of the nozzle. I have found that instead of using a long nozzle to prevent this rotary movement or using a short nozzle having a partition across it, which has the same fault with regard to cleanliness as the long nozzle, the same result can be secured by making the outlet or delivery portion of the nozzle angular in cross section, that is, in providing it with one or more flat walls so that when the faucet is first opened instead of having a smooth wall to receive it the stream finds itself directed against a flat abutment which breaks up any tendency to a rotary movement on its part. The best form of such delivery which I have found is one square in cross section and I have shown one so constructed in the drawings.

My invention then will be understood by reference to the drawings in which:—

Figure 1 is a vertical section of a faucet embodying my invention, Fig. 2 being a perspective view of the plug, and Fig. 3 a side view thereof. Fig. 4 is a side elevation at the inlet end, the handle being removed, and Figs. 5 and 6 are diagrammatic views for the purpose of illustrating the fault above referred to and its correction.

In Figs. 1 to 4, inclusive, A is a casting provided with a threaded end by means of which it is screwed into a coupling B for attachment to the pipe (not shown) running from the source of supply. The casting A has a horizontal passage $a$ leading from the coupling into its interior and it has a vertical conical chamber into which sets the plug C. This plug is provided with the ordinary stem $C^1$ which carries the handle $C^2$ and it is held in place within the vertical passage or chamber in the casting by means of a screw cap D which surrounds the stem $C^1$, being provided with an opening for this purpose and also with the spring $e$ compressing the plug C so that it makes a good joint with the inner wall of the chamber in the casting A. The plug C has within it a passage E which in the form of my invention shown is square in cross section, that is to say, it comprises four walls $e$ at right angles to each other, the passage leading from the bottom of the plug C up through its side to register with the passage $a$ leading from the coupling B.

Upon an examination of Figs. 5 and 6 the utility of my invention will be understood. In Fig. 5 the plug is lettered $C^3$ and the passage through it $E^1$. This passage is round in cross section and it will be seen that as the liquid flows out from the coupling into the plug it acquires a swirling motion which throws it in an umbrella-like form, the extent of throw depending upon the pressure under which the stream runs. This is because when the opening in the plug begins to register with the outlet through the coupling the liquid first strikes the interior circular wall of the passage in the plug and there being no obstruction to it it continues to make a circuit of the passage, moving presumably in spiral form. In the case of my improved plug, as shown in Fig. 6, when the stream first leaves the passage in the coupling instead of engaging a smooth circular wall it engages a flat surface or surfaces e which changes its direction at once and prevents the swirling referred to. These walls act as it were as abutments against which the liquid strikes and so loses its force in a horizontal direction and proceeds to fall in a substantially direct line into the receptacle held below it.

I do not mean to limit myself to the exact construction of the delivery passage shown in the drawings nor to the use of such a delivery passage in the type of faucet above described as it is evident that it is capable of use under various circumstances. The four-sided passage I believe to be best for all ordinary purposes although under certain circumstances where the faucet is large and the stream not very powerful the passage may be differently shaped.

What I claim as my invention is:—

1. In a faucet, a casting having a horizontal passage and a vertical chamber to receive a plug, in combination with said plug, said plug having a single passage therethrough angular in cross section and having substantially flat walls to receive and direct the passage of liquid, as and for the purposes set forth.

2. In a faucet structure, a casting having an unobstructed horizontal passage circular in cross section, and means for coupling said passage to a pipe, said casting having also a vertical passage therethrough to receive a plug, in combination with a plug located to turn in said vertical passage, said plug having an unobstructed delivery passage through it adapted to register with the unobstructed horizontal passage in said casting and having flat walls, and said plug terminating just below the horizontal passage in said casting whereby its vertical passage will be reduced to a minimum of length and it will deliver its stream without swirling.

LEVI L. ROWE.

Witnesses:
M. E. FLAHERTY,
GEORGE LANGTON.

Copies of this patent may be obtained for five cents each, by addressing the "Commissioner of Patents, Washington, D. C."